United States Patent
Sato et al.

(10) Patent No.: US 9,520,612 B2
(45) Date of Patent: Dec. 13, 2016

(54) FUEL CELL

(71) Applicant: TOYOTA JIDOSHA KABUSHIKI KAISHA, Toyota-shi, Aichi-ken (JP)

(72) Inventors: Yasuyuki Sato, Aichi-ken (JP); Hiroaki Takeuchi, Susono (JP); Hitoshi Hamada, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/027,306

(22) PCT Filed: Sep. 3, 2014

(86) PCT No.: PCT/JP2014/004523
§ 371 (c)(1),
(2) Date: Apr. 5, 2016

(87) PCT Pub. No.: WO2015/059858
PCT Pub. Date: Apr. 30, 2015

(65) Prior Publication Data
US 2016/0254563 A1    Sep. 1, 2016

(30) Foreign Application Priority Data
Oct. 22, 2013 (JP) .................. 2013-218988

(51) Int. Cl.
*H01M 8/24* (2016.01)
*H01M 8/10* (2016.01)
*H01M 2/10* (2006.01)

(52) U.S. Cl.
CPC ........... *H01M 8/248* (2013.01); *H01M 8/1004* (2013.01); *H01M 8/1023* (2013.01);
(Continued)

(58) Field of Classification Search
CPC ....... H01M 8/2475; H01M 8/248; H01M 2/10
See application file for complete search history.

(56) References Cited

U.S. PATENT DOCUMENTS

2002/0045087 A1    4/2002  Sugita et al.
2005/0277012 A1*  12/2005  Inagaki ................. H01M 8/247
                                                   429/470
(Continued)

FOREIGN PATENT DOCUMENTS

JP    S58-164170 A    9/1983
JP    2002-056882 A   2/2002
(Continued)

*Primary Examiner* — Jonathan Jelsma
(74) *Attorney, Agent, or Firm* — Andrews Kurth Kenyon LLP

(57) ABSTRACT

There is provided a fuel cell. The fuel cell comprises a stacked body that has a stacked configuration by stacking a plurality of single fuel cells; a fastening support member that is extended along a stacking direction of the plurality of single fuel cells and is configured to fasten the stacked body in the stacking direction; and an impact transmission member that is configured to include a dilatant fluid and is placed between the stacked body and the fastening support member to be arranged in a location corresponding to multiple consecutive single fuel cells along the stacking direction among the plurality of single fuel cells.

3 Claims, 9 Drawing Sheets

(52) U.S. Cl.
CPC ......... *H01M 8/1039* (2013.01); *H01M 8/241* (2013.01); *H01M 8/2457* (2016.02); *H01M 2/10* (2013.01); *H01M 8/2475* (2013.01); *H01M 2008/1095* (2013.01); *H01M 2250/20* (2013.01); *H01M 2300/0082* (2013.01)

(56) References Cited

U.S. PATENT DOCUMENTS

2010/0092836 A1* 4/2010 Saito .................. H01M 8/248
 429/454
2013/0300139 A1* 11/2013 Fukawatase ............ B60R 19/34
 293/133

FOREIGN PATENT DOCUMENTS

| | | | |
|---|---|---|---|
| JP | 2003-203670 A | | 7/2003 |
| JP | 2005-183358 A | | 7/2005 |
| JP | 2010091096 A | * | 4/2010 |
| JP | 2012-195259 A | | 10/2012 |
| JP | 5039866 B2 | | 10/2012 |
| JP | 2013-211240 A | | 10/2013 |
| WO | 2012/081173 A1 | | 6/2012 |
| WO | 2014/132562 A1 | | 4/2014 |

* cited by examiner

FOURTH EMBODIMENT

Fig.9
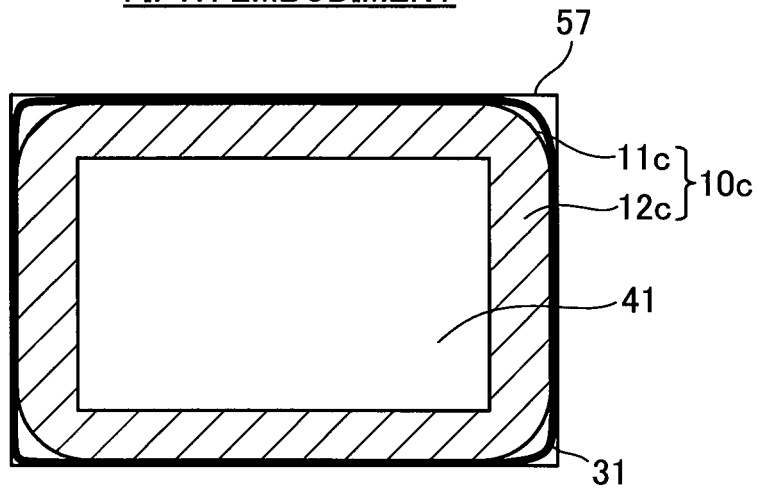
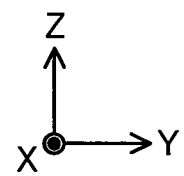
Fig.10
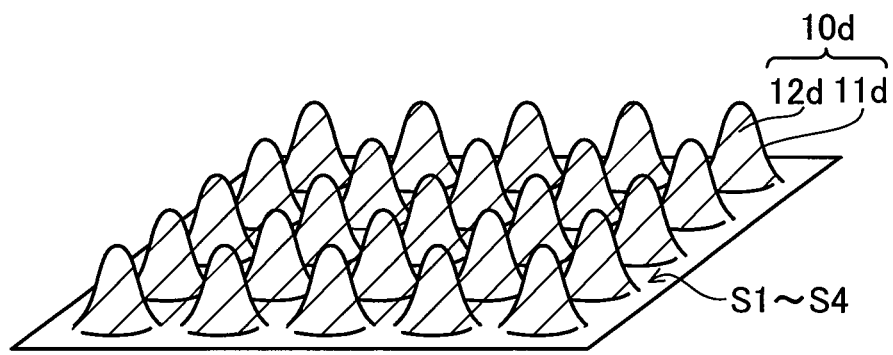

FUEL CELL

CROSS-REFERENCE TO RELATED APPLICATIONS

This is a national phase application based on the PCT International Patent Application No. PCT/JP2014/004523 filed Sep. 3, 2014, claiming priority to Japanese Patent Application No. 2013-218988 filed Oct. 22, 2013, the entire contents of both of which are incorporated herein by reference.

TECHNICAL FIELD

The present invention relates to a fuel cell.

BACKGROUND ART

In order to improve the vibration resistance and the impact resistance, a proposed configuration of a fuel cell includes an elastic material such as silicon or urethane rubber that is filled between a fuel cell stack and a tension plate extended along a stacking direction of a plurality of single fuel cells constituting the fuel cell stack (Patent Literature 1). Another proposed configuration of a fuel cell divides a fuel cell stack into multi-cell modules, each including a plurality of single fuel cells, and fixes an end cell of each of the multi-cell modules to a binding shaft placed along a stacking direction of the fuel cell stack, so as to distribute an impact load applied to the fuel cell stack (Patent Literature 2).

CITATION LIST

Patent Literature

PTL 1: JP 2003-203670A
PTL 2: JP 2005-183358A

SUMMARY

Technical Problem

In the fuel cell described in Patent Literature 1, however, the elastic material has low rigidity and is readily deformed when an inertial force is applied to the fuel cell by an external impact or the like to press the fuel cell against the elastic material. This suppresses damage of the single fuel cells but is likely to cause positional misalignment of the respective single fuel cells. The positional misalignment between adjacent single fuel cells is likely to damage seal between the single fuel cells and cause leakage of a reactive gas or a cooling medium. This problem is not characteristic of the configuration that the elastic material is filled between the tension plate and the fuel cell stack but is commonly found in any configuration that the elastic material is filled between the fuel cell stack and an outer cover provided to cover the fuel cell stack, for example, a configuration that the elastic material is filled between the fuel cell stack and a casing provided to contain the fuel cell stack therein. In the case where a material having high rigidity is used to suppress positional misalignment caused by an external impact, however, this interferes with motion of the single fuel cell in the stacking direction due to a change in environment such as temperature or humidity. This makes it likely to apply a larger load than an expected fastening load to the stacked body and reduce the durability of the single fuel cells.

In the fuel cell described in Patent Literature 2, on the other hand, an insulating member needs to be placed, for example, between the end cell and the binding shaft, in order to provide insulation between the respective end cells of the plurality of multi-cell modules. This need increases the number of components and thereby increases the manufacturing cost of the fuel cell.

With regard to prior art fuel cells, other needs include improvement of the manufacturing efficiency of the fuel cell, power saving and easy manufacture.

Solution to Problem

In order to solve at least part of the above problems, the invention may be implemented by any of the following aspects.

(1) According to one aspect of the invention, there is provided a fuel cell. The fuel cell comprises a stacked body that has a stacked configuration by stacking a plurality of single fuel cells; a fastening support member that is extended along a stacking direction of the plurality of single fuel cells and is configured to fasten the stacked body in the stacking direction; and an impact transmission member that is configured to include a dilatant fluid and is placed between the stacked body and the fastening support member to be arranged in a location corresponding to multiple consecutive single fuel cells along the stacking direction among the plurality of single fuel cells. In the fuel cell of this aspect, the impact transmission member including the dilatant fluid is placed between the stacked body and the fastening support member. In the case where a sudden force is applied to the stacked body by a collision or the like, this configuration causes this force to be transmitted to the fastening support member, while suppressing absorption of this force. This configuration also causes a stress received from the fastening support member to be transmitted to the stacked body, while suppressing absorption of the stress. This accordingly suppresses positional misalignment of the respective single fuel cells. Additionally, in the case where each single fuel cell is slowly displaced in the stacking direction or the like due to, for example, thermal expansion of the single fuel cell, the impact transmission member is deformed along with such displacement and thereby suppresses the occurrence of a gap caused by the displacement of the single fuel cell. In the case where an external force is applied, this configuration causes this force to be transmitted to the fastening support member, while suppressing absorption of this force. This configuration also causes a stress received from the fastening support member to be transmitted to the stacked body, while suppressing absorption of the stress. Additionally, this configuration does not interfere with displacement of the single fuel cell in the stacking direction caused by expansion or contraction. This accordingly suppresses application of an excessive stress to the single fuel cell and improves the durability of the single fuel cell.

(2) In the fuel cell of the above aspect, the fastening support member may include an outer cover that is configured to cover at least part of a side face of the stacked body along the stacking direction. The fuel cell of this aspect causes a sudden force applied to the stacked body to be transmitted to the outer cover, while suppressing absorption of this force. The fuel cell of this aspect also causes a stress received from the outer cover to be transmitted to the stacked body, while suppressing absorption of this stress.

(3) In the fuel cell of the above aspect, the stacked body may have a through hole that is extended along the stacking direction, and the fastening support member may have a rod-like member that is placed in the through hole. The fuel cell of this aspect causes a sudden force applied to the stacked body to be transmitted to the rod-like member, while suppressing absorption of this force. The fuel cell of this aspect also causes a stress received from the rod-like member to be transmitted to the stacked body, while suppressing absorption of this stress.

(4) In the fuel cell of the above aspect, the impact transmission member may include a bag-like member in which the dilatant fluid is placed. The fuel cell of this aspect suppresses leakage of the dilatant fluid in the course of disassembly of the fuel cell for the purpose of maintenance or the like, thus improving the workability.

(5) The fuel cell of the above aspect may further comprise an impact protection member that is placed between the impact transmission member and the stacked body. For example, in the case where a sudden force is applied to the stacked body, the fuel cell of this aspect suppresses the impact transmission member from being damaged by the corner of the single fuel cell.

(6) In the fuel cell of the above aspect, the impact transmission member may be placed in a location corresponding to multiple single fuel cells constituting a middle portion of the stacked body along the stacking direction. In general, when the fuel cell is mounted, the stacked body is fastened by fixing an end of the stacked body in the stacking direction to a support member. In this state, the fastening force applied to the single fuel cells in a middle portion along the stacking direction among the plurality of single fuel cells constituting the stacked body is smaller than the fastening force applied to the single fuel cells in an end portion along the stacking direction. In the case where a sudden force is applied to the stacked body, the single fuel cells in the middle portion along the stacking direction are thus more likely to have positional misalignment. In the fuel cell of this aspect, however, the impact transmission member is placed in the location corresponding to the multiple single fuel cells constituting the middle portion of the stacked body along the stacking direction. This configuration suppresses positional misalignment of the single fuel cells that are more likely to have positional misalignment.

The invention may be implemented by various aspects, for example, a method of manufacturing a fuel cell, a fuel cell system and a vehicle equipped with a fuel cell.

BRIEF DESCRIPTION OF DRAWINGS

FIG. 9 is a diagram illustrating a cross section of a fastening support manifold, an impact transmission member, a fastening support member and an impact protection member; and FIG. 10 is a diagram illustrating the outer shape of impact transmission members according to a modification.

DESCRIPTION OF EMBODIMENTS

A. First Embodiment

Figure 1:
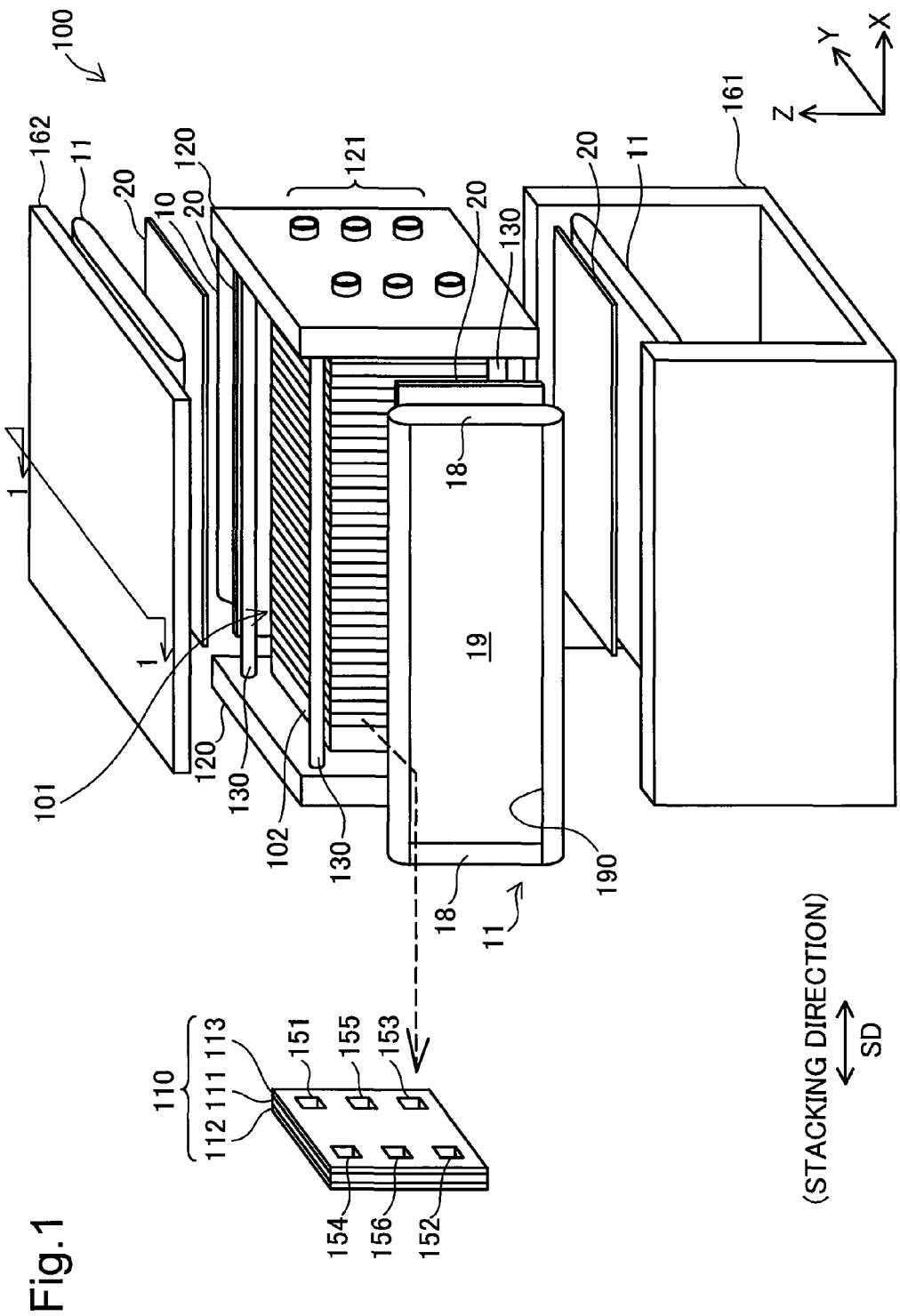
FIG. 1 is an exploded perspective view illustrating the configuration of a fuel cell according to a first embodiment of the invention.
Figure 2:
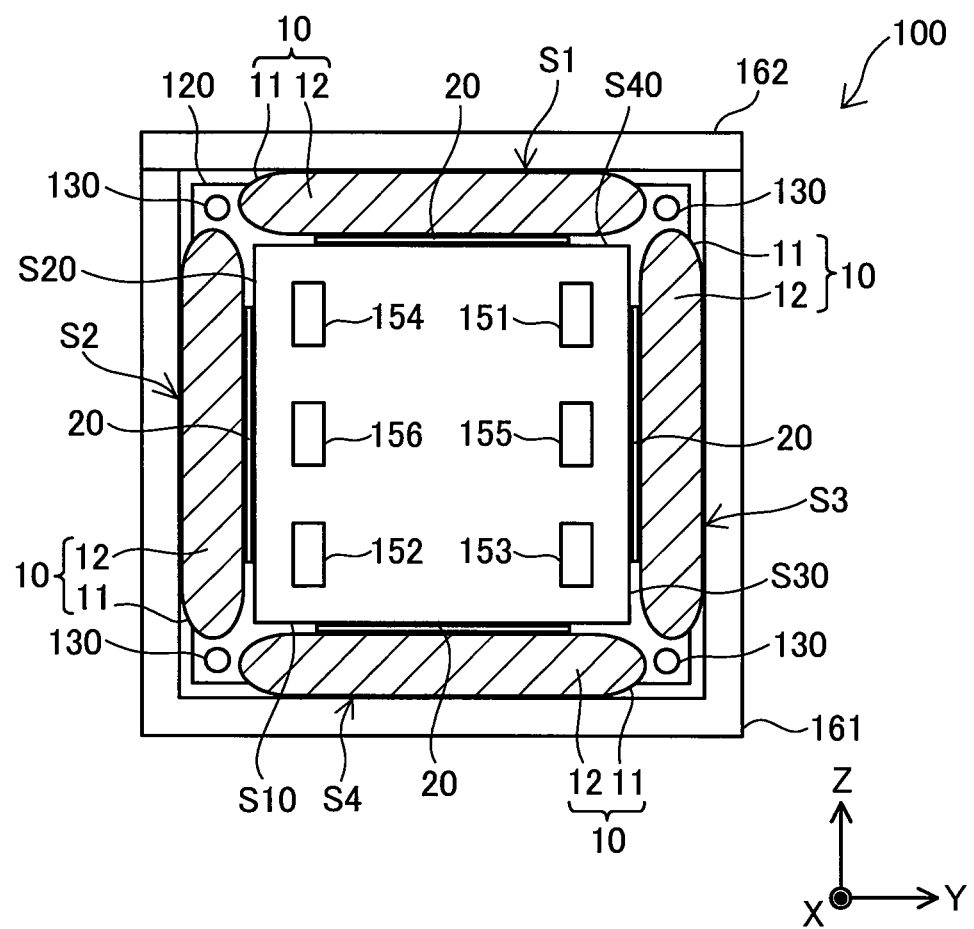
FIG. 2 is a sectional view illustrating the fuel cell according to the first embodiment.

FIG. 1 is an exploded perspective view illustrating the configuration of a fuel cell according to a first embodiment of the invention. FIG. 2 is a sectional view illustrating the fuel cell according to the first embodiment. FIG. 2 shows a cross section taken on a line 1-1 in FIG. 1. As shown in FIG. 1, a fuel cell 100 includes a stacked body 101, a deformation absorbing member 102, a pair of terminal plates 140, four fastening support members 130, four impact protection members 20, a first outer cover 161 and a second outer cover 162. As shown in FIG. 2, the fuel cell 100 also includes four impact transmission members 10. The fuel cell 100 is combined with, for example, supply systems of reactive gases (fuel gas and oxidizing gas) and a supply system of a cooling medium to constitute a fuel cell system. This fuel cell system may be mounted on an electric vehicle or the like to be used as a system of providing power supply for driving.

As shown in FIG. 1, the stacked body 101 has a stacked configuration of a plurality of single fuel cells 110 along a stacking direction SD. The stacking direction SD of the single fuel cells 110 is parallel to X-axis direction (+X direction and −X direction). In the state that the fuel cell 100 is mounted, X-axis direction and Y-axis direction (+Y direction and −Y direction) are directions parallel to the horizontal plane; +Z direction indicates vertically upward direction; and −Z direction indicates vertically downward direction.

According to this embodiment, the single fuel cell 110 is a polymer electrolyte fuel cell. The single fuel cell 110 has an approximately cubic outer shape. As shown in FIG. 2, the single fuel cell 110 has a first side face S10 that forms a bottom face in the state that the fuel cell 100 is mounted, a second side face S20 that is arranged adjacent to the first side face S10, a third side face S30 that is arranged adjacent to the first side face S10 and is opposed to the second side face S20, and a fourth side face S40 that forms a top face and is opposed to the first side face S10. All these four side faces S10, S20, S30 and S40 are side faces along the stacking direction SD. This term "along the stacking direction SD" is used in a wide sense including a direction that crosses the stacking direction SD other than a direction perpendicular to the stacking direction SD, in addition to a direction parallel to the stacking direction SD.

As shown in FIG. 1, the single fuel cell 110 includes a membrane electrode assembly 111 and a pair of separators 112 and 113 arranged to place the membrane electrode assembly 111 therebetween. The membrane electrode assembly 111 includes an electrolyte membrane, two catalyst layers provided on respective surfaces of the electrolyte membrane, and two gas diffusion layers provided to place the electrolyte membrane and the two catalyst layers therebetween. According to this embodiment, the electrolyte membrane is a sulfonate group-containing fluororesin-based ion exchange membrane. The electrolyte membrane is, however, not limited to the sulfonate group-containing membrane but may be another ion exchange group-containing membrane such as phosphate group-containing membrane or carboxylate group-containing membrane. The catalyst layer is formed from a base material (catalyst carrier) in which a catalyst such as platinum or a platinum alloy is supported on a conductive carrier (for example, carbon particles). The gas diffusion layer is formed from a porous material. The porous material may be, for example, a carbon porous material such as carbon paper or a metal porous material such as metal mesh or foamed metal. The separator is formed from a gas-impermeable conductive material. Available examples of such material include dense carbon formed by compression of carbon to be gas impermeable and a press-molded metal plate.

Flow passages of reactive gases and a flow passage of a cooling medium are formed along the stacking direction SD in the single fuel cell 110. More specifically, as shown in FIG. 1, the single fuel cell 110 includes an oxidizing gas supply passage 151, an oxidizing gas exhaust passage 152, a fuel gas supply passage 153, a fuel gas exhaust passage 154, a cooling medium supply passage 155 and a cooling medium discharge passage 156. The stacked arrangement of the individual flow passages of the respective single fuel cells 110 in the stacking direction SD forms an oxidizing gas supply manifold, an oxidizing gas exhaust manifold, a fuel gas supply manifold, a fuel gas exhaust manifold, a cooling medium supply manifold and a cooling medium discharge manifold (not shown) in the stacked body 101.

The deformation absorbing member 102 is provided outside of an end cell (outermost single fuel cell 110) on one side of the stacked body 101 to be placed between this end cell and the terminal plate 120. The deformation absorbing member 102 is made of an elastomer such as rubber and serves to absorb deformation of the stacked body 101 in the stacking direction SD caused by thermal expansion of the single fuel cells 110. The deformation absorbing member 102 may be formed from any elastic body such as spring, instead of the elastomer.

With regard to the pair of terminal plates 120, one terminal plate 120 is placed outside of the deformation absorbing member 102 to be adjacent to the deformation absorbing member 102, while the other terminal plate 120 is placed outside of an end cell on a side without the deformation absorbing member 102 to be adjacent to this end cell. The respective terminal plates 120 serve to collect the electric current generated in the stacked body 101. The pair of terminal plates 120 serve to apply a predetermined fastening force in the stacking direction SD to a stacked assembly including the stacked body 101 and the deformation absorbing member 102. The terminal plate 120 that is not adjacent to the deformation absorbing member 102 has six connection ports 121 that are connected with the respective manifolds formed in the stacked body 101. Planes of each terminal plate 120 perpendicular to the stacking direction SD are formed in a rectangular shape.

The four fastening support members 130 are rod-like members and are arranged between the pair of terminal plates 120 along the stacking direction SD. As shown in FIG. 2, each fastening support member 130 is arranged to connect its corners at corresponding positions of the two terminal plates 120 with each other. The respective fastening support members 130 are connected with both the terminal plates 120 to maintain the fastening force in the stacking direction SD applied to the stacked assembly including the stacked body 101 and the deformation absorbing member 102.

As shown in FIG. 1, the impact transmission member 10 has an outer shape having its longitudinal direction identical with the stacking direction SD. As shown in FIG. 2, the impact transmission member 10 includes a bag body 11 and a dilatant fluid 12 filled inside of the bag body 11. For convenience of illustration, the dilatant fluid 12 is omitted from the illustration of FIG. 1. As shown in FIG. 1, the bag body 11 has a thin bag-like outer shape with an opening and includes a main wall portion 19 and a pair of side wall portions 18. The main wall portion 19 is arranged to face one of the four side faces S10, S20, S30 and S40 of the stacked body 101 ad to be adjacent to the impact protection member 20. The main wall portion 19 has a +X-direction edge connected with one side wall portion 18 and a −X-direction edge connected with the other side wall portion 18. The pair of side wall portions 18 are arranged to be adjacent to the respective terminal plates 120. The bag body 11 is made of a material having low permeability of the dilatant fluid 12. More specifically, the bag body 11 is made of polypropylene according to this embodiment. Another resin or an elastomer such as urethane may be used in place of polypropylene.

An edge portion 190 that forms an opening of each impact transmission member 10 as shown in FIG. 1 is joined with an inner surface of the second outer cover 162 or an inner surface of the first outer cover 161 as shown in FIG. 2. In other words, the opening of each impact transmission member 10 is closed by the first outer cover 161 or by the second outer cover 162. More specifically, as shown in FIG. 2, an inner top face S1 of the second outer cover 162, two inner side faces S2 and S3 along the vertical direction of the first outer cover 161 and an inner bottom face S4 of the first outer cover 161 are respectively joined with the edge portions 190 of the bag bodies 11. According to this embodiment, a bonding method using an adhesive is employed to join the edge portion 190 with the inner surface of the second outer cover 162 or the inner surface of the first outer cover 161. The bonding method using the adhesive may be replaced by any other joining method such as welding or simple insertion.

The dilatant fluid 12 behaves like a solid in response to an abrupt change and shows fluidity in response to a slow deformation. According to this embodiment, the dilatant fluid 12 is made of a material obtained by kneading and drying a mixture of silicone oil and boric acid with a small amount of a catalyst (for example, iron chloride or nickel chloride) in a high temperature environment (for example, temperature of not lower than 100 degrees Celsius). Available examples of such material include Dow Corning 3179 ("Dow Corning" is registered trademark) manufactured by Dow Corning Corporation and M48 and M49 manufactured by Wacker GmbH.

As described above, the opening of each bag body 11 is closed by the first outer cover 161 or the second outer cover 162, so as to prevent leakage of the dilatant fluid 12 from the bag body 11.

The impact protection member 20 is a thin flexible cloth member and has a rectangular outer shape having its longitudinal direction identical with the stacking direction SD. According to this embodiment, the impact protection member 20 is formed from Kevlar (registered trademark). The impact protection member 20 may be formed from any other material, such as glass fiber, having the higher rigidity than that of the bag body 11, in place of Kevlar. The impact protection member 20 may alternatively be formed from a material having the lower rigidity than that of the bag body 11. According to this embodiment, the impact protection member 20 has the lower rigidity than that of the dilatant fluid 12. The rigidity of the dilatant fluid 12 to be compared with the rigidity of the impact protection member 20 herein means the rigidity measured by application of a sudden impact to the impact transmission member 10.

The impact protection member 20 is placed between the impact transmission member 10 and each side face along the stacking direction SD of the stacked body 101. More specifically, one impact protection member 20 is placed between the first side face S10 of the stacked body 101 and the impact transmission member 10 joined with the bottom face S4 of the first outer cover 161. One impact protection member 20 is placed between the second side face S20 of the stacked body 101 and the impact transmission member 10 joined with the side face S2 of the first outer cover 161. One impact protection member 20 is placed between the third side face S30 of the stacked body 101 and the impact transmission member 10 joined with the side face S3 of the first outer cover 161. One impact protection member 20 is placed between the fourth side face S40 of the stacked body 101 and the impact transmission member 10 joined with the second outer cover 162. According to this embodiment, the contact areas of each impact transmission member 10 and the corresponding impact protection member 20 are entirely bonded to each other. The contact areas of each impact transmission member 10 and the corresponding impact protection member 20 may be only partly bonded to each other. Such contact areas may not be bonded to each other. The impact protection member 20 serves to protect the bag body 11 from an impact. For example, the impact protection member 20 suppresses the bag body 11 from being damaged by the corner of the single fuel cell 110 when a sudden force is applied to the fuel cell 100.

As shown in FIGS. 1 and 2, the first outer cover 161 is formed in an outer shape of an approximately U-shaped cross section viewed in the X-axis direction. The length in the X-axis direction of the first outer cover 161 is approximately equal to the length in the X-axis direction of an assembly including the stacked body 101, the deformation absorbing member 102 and the pair of terminal plates 120. The first outer cover 161 is configured to cover the entire fuel cell 100 except the first outer cover 161 and the second outer cover 162 upward (in the +Z direction) and sideways (in the +Y direction and −Y direction). The second outer cover 162 is a plate-like member having its thickness direction identical with the Z-axis direction and is arrange to cover the upper opening of the first outer cover 161.

The first outer cover 161 and the second outer cover 162 described above correspond to the fastening support member and the outer cover in the claims. The bag body 11 corresponds to the bag-like member in the claims.

Figure 3:
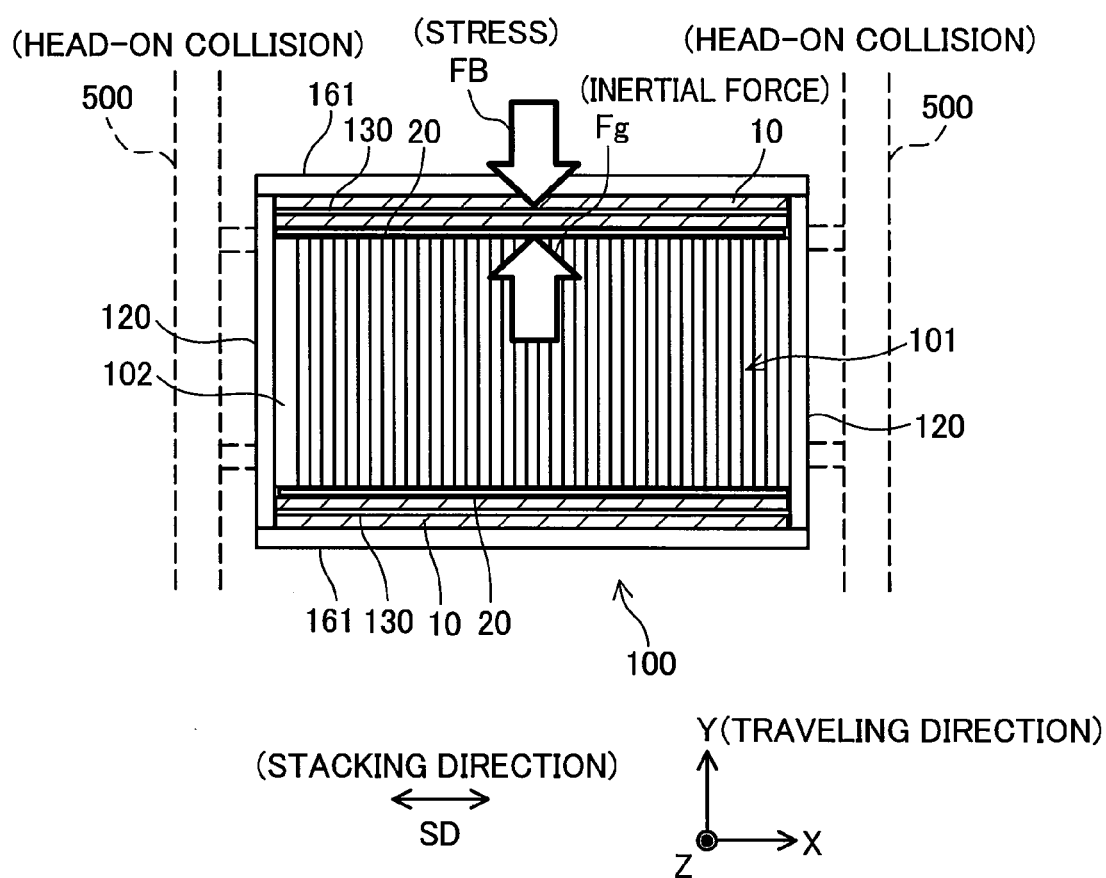
FIG. 3 is a diagram illustrating an inertial force applied to fuel cell in the state that the fuel cell is mounted on a vehicle.

FIG. 3 is a diagram illustrating an inertial force applied to the fuel cell 100 in the state that the fuel cell 100 is mounted on a vehicle. As shown in FIG. 3, the first outer cover 161 is fixed to a side member 500 of the vehicle. For example, in the case of a head-on collision of the vehicle in this state, an inertial force Fg in a traveling direction is applied to the stacked body 101 that is not directly connected with the side member 500. The respective single fuel cells 110 constituting the stacked body 101 are likely to be shifted in the traveling direction. Especially the single fuel cells 110 located in a middle portion in the stacking direction SD (X-axis direction) of the single fuel cells 110 receive only a weak fastening force applied by the pair of terminal plates 120 and are thus likely to be shifted significantly. The impact transmission member 10 is provided on a traveling direction side of the stacked body 101. The dilatant fluid 12 of the impact transmission member 10 behaves like a solid in response to an abrupt change. Accordingly the dilatant fluid 12 transmits the inertial force Fg to the first outer cover 161, while suppressing deformation or more specifically suppressing absorption of the inertial force Fg. The first outer cover 161 then transmits a stress FB in the reverse direction to the inertial force Fg to the impact transmission member 10, and the impact transmission member 10 transmits the stress FB via the impact protection member 20 to the stacked body 101. This results in suppressing positional misalignment of the respective single fuel cells 110 in the stacked body 101.

In the case where each single fuel cell 110 is slowly displaced in the stacking direction SD due to, for example, thermal expansion of the single fuel cell 110, unlike the case of the collision described above, the dilatant fluid 12 behaves as a fluid and is deformed to fill a gap caused by the displacement of the single fuel cell 110 (gap between the single fuel cell 110 and the impact protection member 20). This suppresses the occurrence of a gap between the single fuel cell 110 and the impact protection member 20. In the case of a collision, this accordingly causes the inertial force Fg to be transmitted via the impact transmission member 10 to the first outer cover 161, while suppressing positional misalignment of the single fuel cell 110.

In the fuel cell 100 of the first embodiment described above, the impact transmission member 10 including the dilatant fluid 12 is placed between the stacked body 101 and the first outer cover 161 or the second outer cover 162. In the case where a sudden force is applied to the stacked body 101 by a collision or the like, this configuration transmits this force to the first outer cover 161 or the second outer cover 162, while suppressing absorption of this force. This configuration also transmits a stress resulting from this force to the stacked body 101, while suppressing absorption of the stress. This results in suppressing positional misalignment of the respective single fuel cells 110 and thereby suppresses leakage of the reactive gas or the cooling medium due to the positional misalignment of the single fuel cells 110.

Additionally, in the case where each single fuel cell 110 is slowly displaced due to, for example, thermal expansion of the single fuel cell 110, the impact transmission member 10 is deformed along with such displacement. This configuration does not interfere with displacement of the single fuel cell 110. This accordingly suppresses application of an excessive stress to the single fuel cell 110 and improves the durability of the single fuel cell 110. The impact transmission member 10 is deformed along with such displacement of the single fuel cell 110. This suppresses the occurrence of a gap caused by the displacement of the single fuel cell 110. Accordingly this configuration more stably suppresses positional misalignment of the respective single fuel cells 110 in the case where a sudden force is applied to the stacked body 101.

The impact transmission member 10 has an elongated shape having its longitudinal direction identical with the stacking direction SD, so that the dilatant fluid 12 is placed in a location corresponding to a large number of the single fuel cells 110 out of the respective single fuel cells 110 of the stacked body 101. This configuration suppresses positional misalignment of the large number of the single fuel cells 110.

The impact transmission member 10 is configured such that the opening of the bag body 11 is closed by the first outer cover 161 or the second outer cover 162 and that the dilatant fluid 12 is placed in the bag body 11. This configuration suppresses leakage of the dilatant fluid 12 in the course of detachment of the first outer cover 161 or the second outer cover 162, thus improving the workability.

The impact protection member 20 is placed between the impact transmission member 10 and the stacked body 101. This suppresses the bag body 11 from being damaged by the corner of the single fuel cell 110 in the case where a sudden force is applied to the fuel cell 100.

B. Second Embodiment

Figure 4:
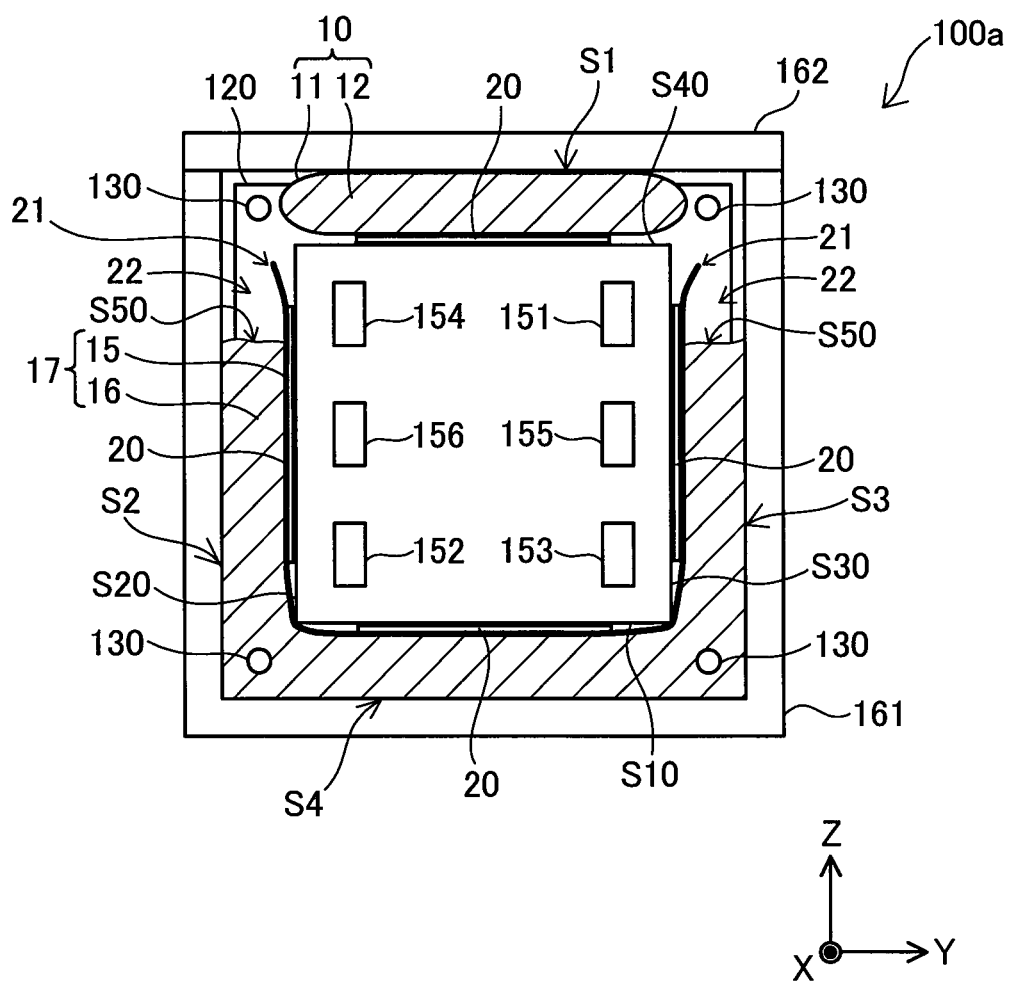
FIG. 4 is a sectional view illustrating a fuel cell according to a second embodiment.

FIG. 4 is a sectional view illustrating a fuel cell according to a second embodiment. A fuel cell 100a of the second embodiment differs from the fuel cell 100 of the first embodiment by having a second impact transmission member 17 in place of the three impact transmission members 10 that are joined with the first outer cover 161. Otherwise the configuration of the fuel cell 100a is similar to that of the fuel cell 100, so that its detailed description is omitted. In the second embodiment, the impact transmission member 10 of the first embodiment is called "first impact transmission member 10".

FIG. 4 shows a cross section of the fuel cell 100a at a corresponding position to the 1-1 cross section shown in FIG. 1. As shown in FIG. 4, the fuel cell 100a includes the second impact transmission member 17. The second impact transmission member 17 includes an impact support film 15 and a dilatant fluid 16.

The impact support film 15 is a cloth member and is arranged to continuously cover a first side face S10, a second side face S20 and a third side face S30 of the fuel cell 100a. The impact support film 15 is arranged to be adjacent to three impact protection members 20 that are respectively placed adjacent to the above three side faces S10, S20 and S30. These three impact protection members 20 are bonded to the impact support film 15. The impact support film 15 is formed from the same material as that of the bag body 11 of the first embodiment. The positions in the Z-axis direction of +Z-direction ends 21 of the impact support film 15 are approximately equal to the position in the Z-axis direction of a fourth side face S40 of fuel cell 100a. The ends 21 of the impact support film 15 are not in contact with the first outer cover 161 or the second outer cover 162. In other words, the ends 21 of the impact support film 15 are free ends. Openings 22 are accordingly formed between the ends 21 and the first outer cover 161. Ends in the X-axis direction (+X-direction end and −X-direction end) of the impact support film 15 are joined with the pair of terminal plates 120.

In the second embodiment, the dilatant fluid 16 is placed in a space defined by the impact support film 15, the inner walls (side face S2, side face S3 and bottom face S4) of the first outer cover 161 and the pair of terminal plates 120. The entire bottom face S4, a vertically lower portion of the side face S2 and a vertically lower portion of the side face S3 of the first outer cover 161 are directly exposed to the dilatant fluid 16. The dilatant fluid 16 is made of the same material as that of the dilatant fluid 12 of the first embodiment. As shown in FIG. 4, the positions in the Z-axis direction of upper ends S50 of the dilatant fluid 16 are located below (lower than) the positions in the Z-axis direction of the ends 21 (openings 22) of the impact support film 15.

The first impact transmission member 10 is joined with the second outer cover 162, like the first embodiment.

The fuel cell 100a of the second embodiment having the above configuration has similar advantageous effects to those of the fuel cell 100 of the first embodiment. Additionally, the second impact transmission member 17 is readily formed by placing the impact support film 15 around the stacked body 101 joined with the impact protection members 20 and injecting the dilatant fluid 16 between the impact support film 15 and the first outer cover 161. The ends 21 are free ends, and the openings 22 are formed between the end 21 and the side face S2 and between the end 21 and the side face S3. In the case where a large force is applied to the second impact transmission member 17, this configuration suppresses the pressure of the dilatant fluid 16 from increasing to break off the second impact transmission member 17. The positions in the Z-axis direction (vertically upward positions) of the upper ends S50 of the dilatant fluid 16 are located below the positions in the Z-axis direction of the ends 21 (openings 22) of the impact support film 15. In the case where a large force is applied to the second impact transmission member 17, this configuration suppresses the dilatant fluid 16 from being ejected from the openings 22 beyond the ends 21.

C. Third Embodiment

Figure 5:
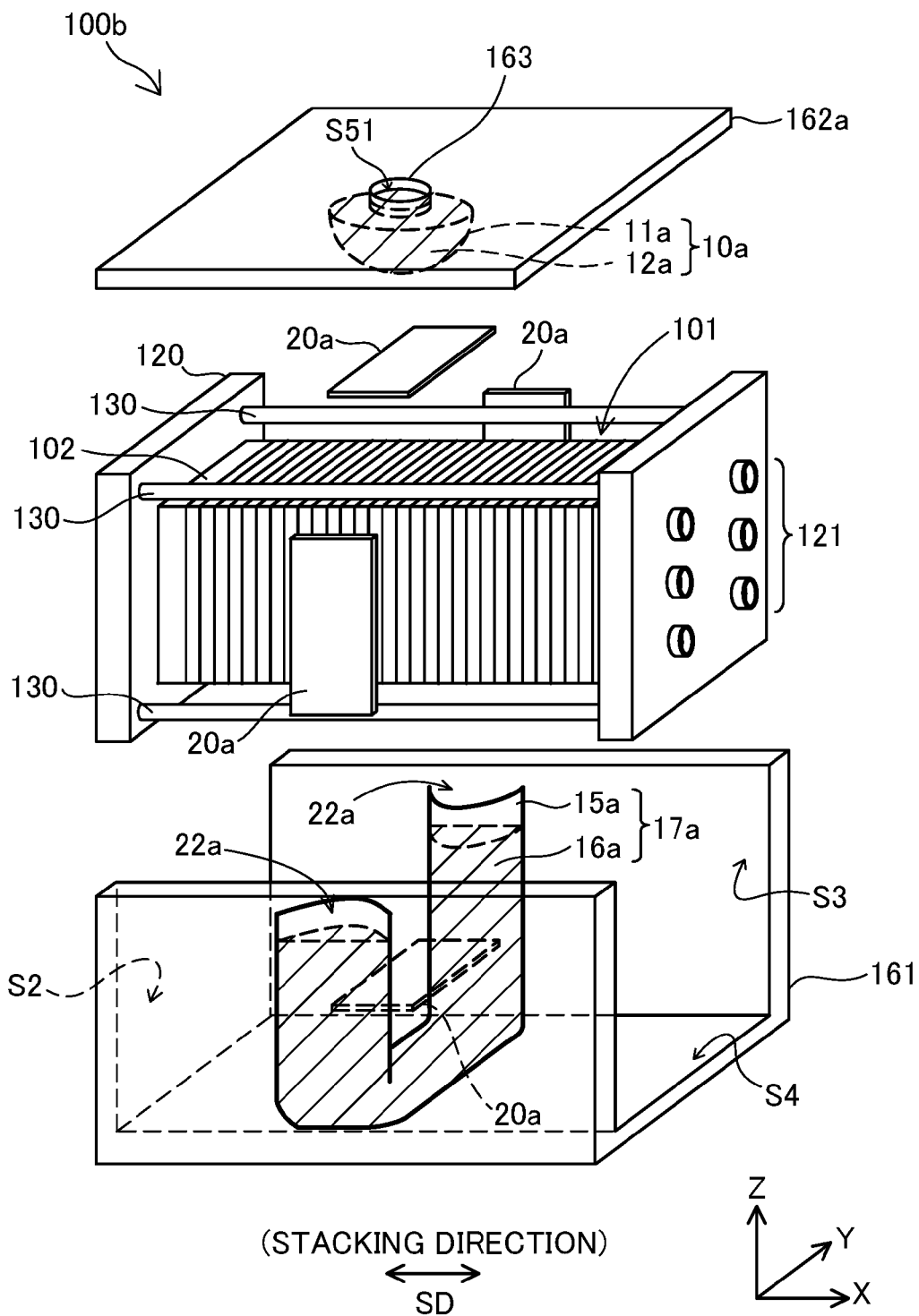
FIG. 5 is an exploded perspective view illustrating a fuel cell according to a third embodiment.

FIG. 5 is an exploded perspective view illustrating a fuel cell according to a third embodiment. A fuel cell 100b of the third embodiment differs from the fuel cell 100 of the first embodiment by having a second outer cover 162a in place of the second outer cover 162, having a third impact transmission member 10a and a fourth impact transmission member 17a in place of the four impact transmission members 10, and having four impact protection members 20a in place of the four impact protection members 20, but otherwise has similar configuration to that of the fuel cell 100.

The second outer cover 162a differs from the second outer cover 162 of the first embodiment by a through hole 163 formed in the thickness direction (Z-axis direction) in its center portion. Otherwise the configuration of the second outer cover 162a is similar to that of the second outer cover 162, so that its detailed description is omitted.

The third impact transmission member 10a includes a bag body 11a and a dilatant fluid 12a. The bag body 11a differs from the bag body 11 of the first embodiment by having a hemispherical outer shape. The other configuration and the material of the bag body 11a are similar to those of the bag body 11. The bag body 11a has a circular +Z-direction end that is joined with a center portion on a lower surface (surface facing the stacked body 101) of the second outer cover 162a. A space defined by the bag body 11a and the second outer cover 162a communicates with the through hole 163. The dilatant fluid 12a is placed in the space defined by the bag body 11a and the second outer cover 162a. The position in the Z-axis direction of an upper end of the dilatant fluid 12a is located below (lower than) the position in the Z-axis direction of an upper surface of the second outer cover 162a. The third impact transmission member 10a has a length in the X-axis direction that is shorter than the length in the X-axis direction of the stacked body 101. The dilatant fluid 12a is injected into the bag body 11a via the through hole 163 provided in the second outer cover 162a.

The fourth impact transmission member 17a includes an impact support film 15a and a dilatant fluid 16a. The impact support film 15a is in an approximately U shape formed by bending a rectangular film along its short sides and deforming the rectangular film along the side face S2, the side face S3 and the bottom face S4. The respective sides other than +Z-direction ends of the impact support film 15a are respectively joined with the side face S2, the side face S3 and the bottom face S4. The +Z-direction ends of the impact support film 15a are not joined with the first outer cover 161 or the second outer cover 162. Openings 22a are accordingly formed at the +Z-direction ends of the fourth impact transmission member 17a. The positions in the Z-axis direction of the +Z-direction ends of the impact support film 15a are located below (lower than) the positions of the ends in the Z-axis direction of the first outer cover 161.

The dilatant fluid 16a is placed in a space defined by the impact support film 15a and the side face S2, a space defined by the impact support film 15a and the side face S3 and a space defined by the impact support film 15a and the bottom face S4. The dilatant fluid 16a is made of the same material as that of the dilatant fluid 12 of the first embodiment. As shown in FIG. 5, the positions in the Z-axis direction of upper ends of the dilatant fluid 16a are located below (lower than) the positions in the Z-axis direction of the openings 22a.

The impact protection member 20a differs from the impact protection member 20 by having the length in the X-axis direction that is shorter than the length in the X-axis direction of the impact protection member 20 of the first embodiment, but otherwise has similar configuration to that of the impact protection member 20. The length in the X-axis direction of the impact protection member 20a is shorter than the length in the X-axis direction of the stacked body 101. The length in the X-axis direction of the impact protection member 20a may be, for example, equivalent to the total length (total thickness) in the X-axis direction of several to several tens of single fuel cells 110. Each impact protection member 20a is placed in a location corresponding to a middle portion in the X-axis direction of the stacked body 101. In other words, each impact protection member 20a is placed in a location corresponding to at least a center single fuel cell 110 of the stacked body 101 and several single fuel cells 110 adjacent to the center single fuel cell 110.

The fuel cell 100b of the third embodiment having the above configuration has similar advantageous effects to those of the fuel cell 100 of the first embodiment. More specifically, the third impact transmission member 10a and the fourth impact transmission member 17a are placed in a location corresponding to the single fuel cells 110 in the middle portion that are more likely to have positional misalignment by application of a sudden impact. This configuration suppresses the positional misalignment of such single fuel cells 110.

The lengths in the X-axis direction of the third impact transmission member 10a and the fourth impact transmission member 17a are shorter than the length in the X-axis direction of the stacked body 101. This configuration allows for downsizing of the third impact transmission member 10a and the fourth impact transmission member 17a, compared with the configuration that the lengths in the X-axis direction of the third impact transmission member 10a and the fourth impact transmission member 17a are equivalent to the length in the X-axis direction of the stacked body 101. This achieves weight reduction of the fuel cell 100b. Both the third impact transmission member 10a and the fourth impact transmission member 17a have the open +Z-direction ends. Like the configuration of the second embodiment described above, in the case where a large force is applied to the third impact transmission member 10a or the fourth impact transmission member 17a, this configuration suppresses the pressure of the dilatant fluid 12a or the dilatant fluid 16a from increasing to break off the bag body 11a or the impact support film 15a.

D. Fourth Embodiment

Figure 6:
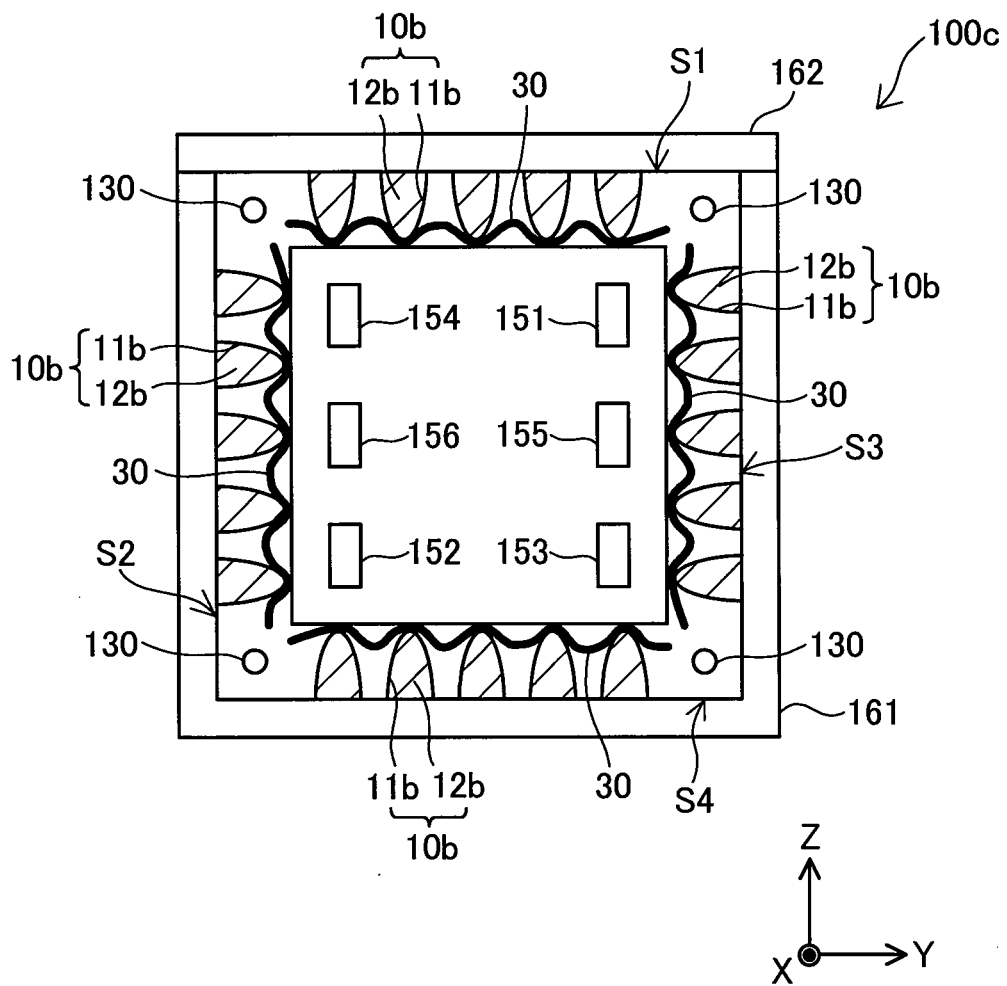
FIG. 6 is a sectional view illustrating a fuel cell according to a fourth embodiment.

FIG. 6 is a sectional view illustrating a fuel cell according to a fourth embodiment. A fuel cell 100c of the fourth embodiment differs from the fuel cell 100 of the first embodiment by having twenty impact transmission members 10b in place of the four impact transmission members 10 and having four impact protection members 30 in place of the four impact transmission members 20. Otherwise the configuration of the fuel cell 100c is similar to that of the fuel cell 100, so that its detailed description is omitted.

Figure 7:
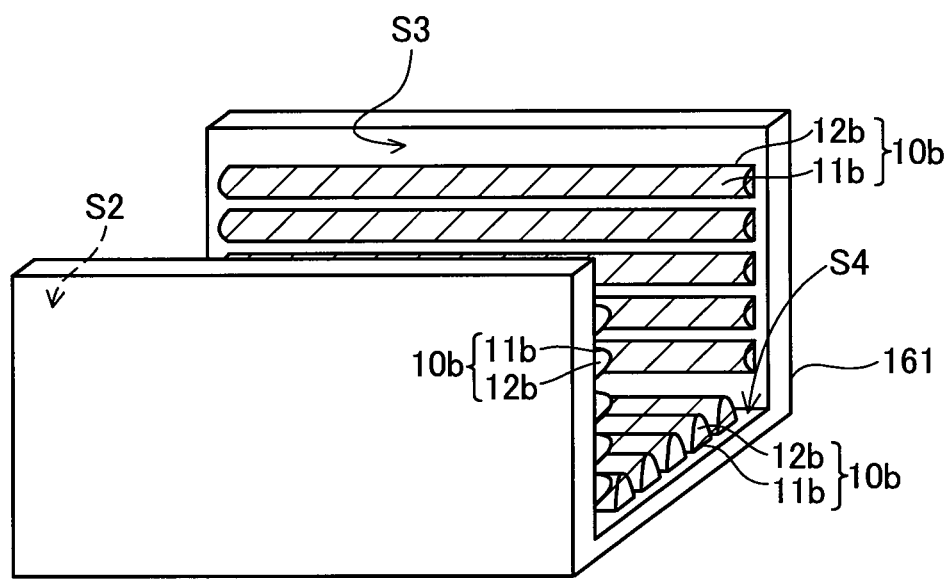
FIG. 7 is a perspective view illustrating a first outer cover and impact transmission members in the fuel cell according to the fourth embodiment.

FIG. 7 is a perspective view illustrating the first outer cover 161 and the impact transmission members 10b in the fuel cell 100c according to the fourth embodiment. As shown in FIGS. 6 and 7, five impact transmission members 10b are joined with each of the inner side face S2, the inner side face S3 and the inner bottom face S4 of the first outer cover 161. As shown in FIG. 6, five impact transmission members 10b are joined with the inner top face S1 of the second outer cover 162. As shown in FIGS. 6 and 7, each impact transmission member 10b has a columnar outer shape of semi-elliptical cross section and is extended along the X-axis direction. The respective impact transmission members 10b are arrayed and arranged at predetermined intervals in the Z-axis direction or in the Y-axis direction to be parallel to one another on the second outer cover 162 or the first outer cover 161.

As shown in FIGS. 6 and 7, the impact transmission member 10b of the fourth embodiment includes a bag body 11b and a dilatant fluid 12b. The bag body 11b has a different outer shape from that of the bag body 11 of the first embodiment. The other configuration and the material of the bag body 11b are similar to those of the bag body 11. The bag body 11b has an opening that is closed by the second outer cover 162 or the first outer cover 161.

The dilatant fluid 12b is placed in a space defined by each bag body 11b and the second outer cover 162 or the first outer cover 161. The dilatant fluid 12b is made of the same material as that of the dilatant fluid 12 of the first embodiment.

The impact protection member 30 is a cloth member and is placed between the impact transmission member 10b and each side face of the stacked body 101 along the stacking direction SD. The impact protection member 30 differs from the impact protection member 20 of the first embodiment by having a surface that is opposed to the impact transmission members 10b and is partly not in contact with the impact transmission members 10b. The other configuration and the material of the impact protection member 30 are similar to those of the impact protection member 20. The surface of each impact protection member 30 opposed to the impact transmission members 10b is in contact with only the tops of the impact transmission members 10b (i.e., most distant portions of the impact transmission members 10b that are farthest toward the stacked body 101 from contact portions of the impact transmission members 10b in contact with the second cover 162 or the first cover 161), and the residual surface is not in contact with the impact transmission members 10b. The contact regions between the impact protection member 30 and the impact transmission members 10b are fully joined with each other, like the contact regions between the impact transmission member 10 and the impact protection member 20 of the first embodiment.

The fuel cell 100c of the fourth embodiment having the above configuration has similar advantageous effects to those of the fuel cell 100 of the first embodiment. Additionally, each of the faces S10, S20, S30 and S40 of the stacked body 101 is supported by the plurality of impact transmission members 10b. This enhances the bearing power on each face.

E. Fifth Embodiment

Figure 8:
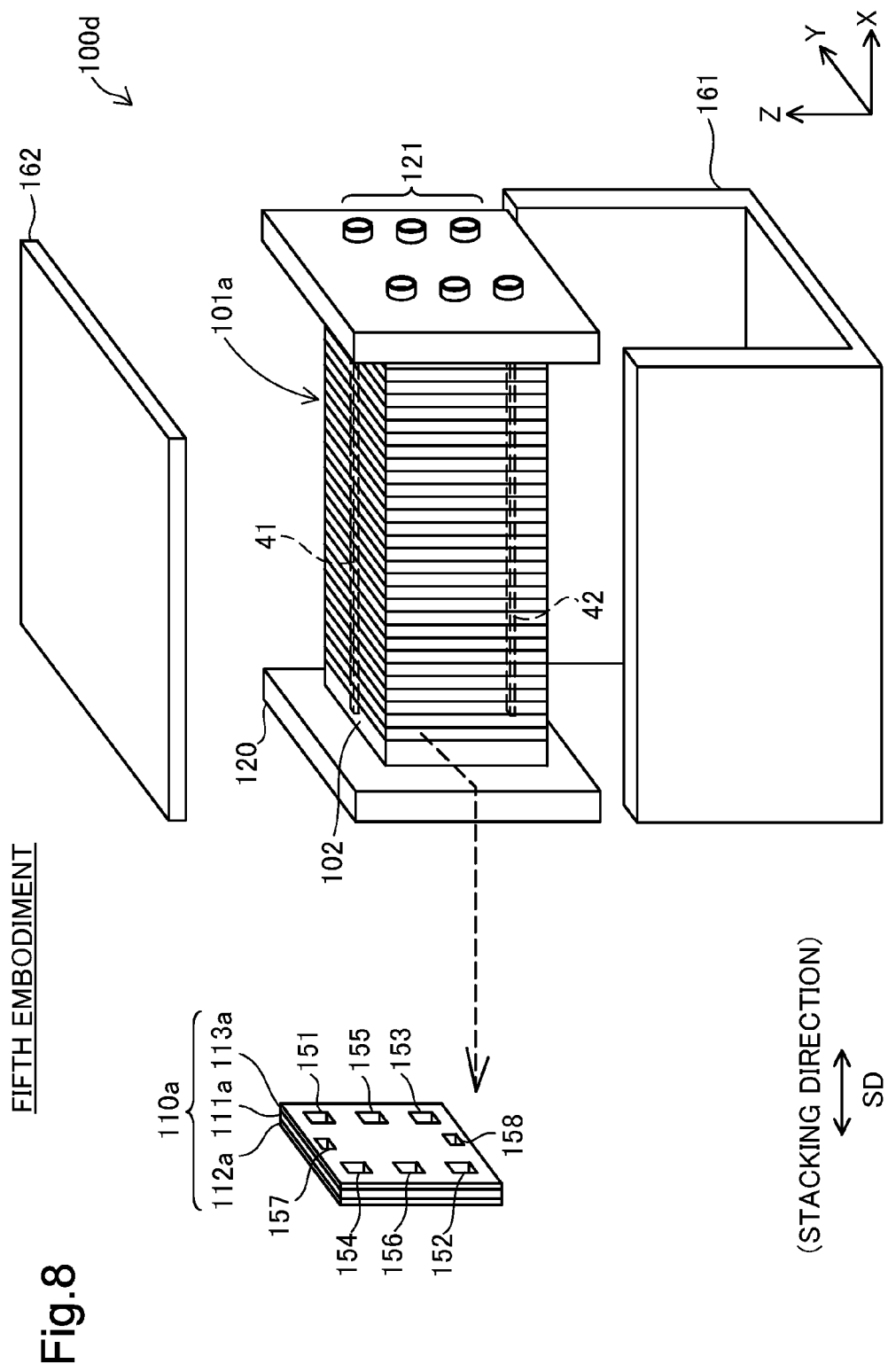
FIG. 8 is an exploded perspective view illustrating the configuration of a fuel cell according to a fifth embodiment.

FIG. 8 is an exploded perspective view illustrating the configuration of a fuel cell according to a fifth embodiment. A fuel cell 100d of the fifth embodiment differs from the fuel cell 100 of the first embodiment by having fastening support manifolds that are formed inside of a stacked body 101a and the deformation absorbing member 102, having two fastening support members 41 and 42 in place of the four fastening support members 130, having two impact transmission members 10c in place of the four impact transmission members 10 and having two impact protection members 31 in place of the four impact protection members 20, but otherwise has similar configuration to that of the fuel cell 100.

As shown in FIG. 8, a single fuel cell 110a of the fifth embodiment differs from the single fuel cell 110 of the first embodiment by having two through holes 157 and 158 that are formed in the thickness direction, but otherwise has similar configuration to that of the single fuel cell 110. The stacked arrangement of the individual through holes 157 and 158 of the respective single fuel cells 100 in the stacking direction SD forms two manifolds (fastening support manifolds) along the stacking direction SD inside of the stacked body 101a For convenience of illustration, the two fastening support manifolds are omitted from the illustration of FIG. 8. Two through holes (not shown) are also formed in the thickness direction in the deformation absorbing member 102. These two through holes are arranged at the corresponding positions to the through holes 157 and 158 of the respective single fuel cells 110a in the X-axis direction.

The two fastening support members 41 and 42 differ from the fastening support members 130 of the first embodiment by being placed in the fastening support manifolds (not shown) and having a quadrangular prism outer shape, but otherwise have similar configuration to that of the fastening support members 130. The fastening support members 41 and 42 may be formed in a columnar outer shape like the outer shape of the fastening support members 130 of the first embodiment.

FIG. 9 is a diagram illustrating a cross section of the fastening support manifold, the impact transmission member 10c, the fastening support member 41 and the impact protection member 31. Like FIG. 2, FIG. 9 shows a cross section perpendicular to the stacking direction SD.

The fastening support manifold 57 shown in FIG. 9 is formed by stacking the through holes 157 of the respective single fuel cells 110a shown in FIG. 8. As shown in FIG. 9, the impact transmission member 10c of the fifth embodiment is placed inside of the fastening support manifold 57. The impact transmission member 10c includes a bag body 11c and a dilatant fluid 12c. The bag body 11c has a tubular outer shape having its longitudinal direction identical with the X-axis direction and is configured to cover the fastening support member 41. The bag body 11c has two ends in the X-axis direction that are joined with the pair of terminal plates 120. The bag body 11c is formed from the same material as that of the bag body 11 of the first embodiment.

The dilatant fluid 12c is placed in a space defined by the bag body 11c, the outer surface of the fastening support member 41 and the pair of terminal plates 120. The dilatant fluid 12c is made of the same material as that of the dilatant fluid 12 of the first embodiment.

The impact protection member 31 has a similar shape to that of the bag body 11c and is placed inside of the fastening support manifold 57 to cover the bag body 11c. The impact protection member 31 is placed between the respective wall surfaces of the respective single fuel cells 110a forming the fastening support manifold 57 (through holes 157) (i.e., respective wall surfaces exposed on the through holes 157) and the impact transmission member 10c The impact protection member 31 is formed from the same material as that of the impact protection member 20 of the first embodiment. The impact protection member 31 is joined with the above respective wall surfaces of the respective single fuel cells 110a forming the fastening support manifold 57 (through holes 157). The internal configuration of the fastening support manifold (not shown) formed by stacking the through holes 158 of the respective single fuel cells 110a is similar to the internal configuration of the fastening support manifold 57 described above and is thus not specifically described.

The fuel cell 100d of the fifth embodiment having the above configuration has similar advantageous effects to those of the fuel cell 100 of the first embodiment. More specifically, in the case where a large inertial force is applied to the stacked body 101a in a short time period by a collision or the like, the dilatant fluid 12c behaves like a solid to transmit the inertial force to the fastening support members 41 and 42, while suppressing deformation or more specifically suppressing absorption of the inertial force. The fastening support members 41 and 42 then transmit a stress in the reverse direction to the inertial force to the impact transmission members 10c, and the impact transmission members 10c transmit the stress via the impact protection members 31 to the stacked body 101a. This configuration suppress positional misalignment of the respective single fuel cells 110a in the stacked body 101a In the case where each single fuel cell 110a is slowly displaced in the stacking direction SD due to, for example, thermal expansion of the single fuel cell 110a, the dilatant fluid 12c behaves as a fluid and is deformed to fill a gap caused by the displacement of the single fuel cell 110a (gap between the wall surface forming the fastening support manifold and the impact protection member 31). This suppresses the occurrence of a gap between the wall surface forming the fastening support manifold and the impact protection member 31. In the case of a collision, this accordingly causes the inertial force to be transmitted via the impact transmission members 10c to the fastening support members 41 and 42, while suppressing positional misalignment of the single fuel cell 110a. Additionally, this configuration does not interfere with displacement of the single fuel cell 110a in the stacking direction SD caused by expansion or contraction. This accordingly suppresses application of an excessive stress to the single fuel cell 110a and improves the durability of the single fuel cell 110a.

The fastening support members 41 and 42 of the fifth embodiment described above correspond to the fastening support member and the rod-like member in the claims.

F. Modifications

F1. Modification 1

The configurations of the fuel cells 100 and 100a to 100d of the respective embodiments are only illustrative and may be modified and changed in various ways. For example, the bag body 11 of the first embodiment has an opening that is joined with the top face S1 of the second outer cover 162 or with the side face S2, the side face S3 and the bottom face S4 of the first outer cover 161. The invention is, however, not limited to this configuration. According to a modification, the opening of the bag body 11 may be joined with the surface of the stacked body 101 or with the impact protection member 20, in place of the first outer cover 161 and the second outer cover 162. According to another modification, a sealed bag body (without an opening) previously filled with the dilatant fluid 12 may be used as the impact transmission member 10. This impact transmission member 10 may be placed between the stacked body 101 (impact protection member 20) and the first outer cover 161 and between the stacked body 101 (impact protection member 20) and the second outer cover 162. In this modified configuration, the impact transmission member 10 may not be joined with the first outer cover 161 and may not be joined with the second outer cover 162. In this modified configuration, a configuration that the bag body 11 is filled with the dilatant fluid 12 with leaving some room (i.e., the dilatant fluid 12 filled in the bag body 11 has the smaller volume than the internal capacity of the bag body 11) may be employed, in addition to the configuration that the bag body 11 is filled with the dilatant fluid 12 without leaving any room. In the configuration that the bag body 11 is filled with the dilatant fluid 12 with leaving some room, forming the bag body 11 from a material having high permeability to the air but low permeability to the dilatant fluid 12 allows the air inside of the bag body 11 to be released outside in the case where a sudden external force is applied. The impact protection member using this bag body 11 has the similar functions and the similar advantageous effects to those of the impact protection member 20 of the first embodiment.

Another modification may omit the first impact transmission member 10 from the fuel cell 100a of the second embodiment. Another modification may omit the impact protection members 20, 20a, 30 or 31 from the respective embodiments. In the fuel cell 100c of the fourth embodiment, the number of the impact transmission members 10b placed on each of the top face S1 of the second outer cover 162 and the side face S2, the side face S3 and the bottom face S4 of the first outer cover 161 is five. The number of the impact transmission members 10b is, however, not limited to five but may be any arbitrary number. In the fuel cell 100d of the fifth embodiment, the four fastening support members 130 of the first embodiment may be provided, in addition to the two fastening support members 41 and 42.

According to the respective embodiments, the impact protection members 20 or 20a are configured to have the lower rigidity than the dilatant fluid 12 or 12a to 12d. The rigidity of the impact protection members 20 or 20a may alternatively be configured to have the higher rigidity than the dilatant fluid 12 or 12a to 12d. This modified configuration enables a force to be evenly applied to the stacked body 101 or 101a (force to be distributed) in the case where a stress is applied to the fuel cell 100 or 100a to 100d, while the impact protection members 20 or 20a serve to suppress the bag body 11 or 11a to 11d from being broken off F2. Modification 2

FIG. 10 is a diagram illustrating the outer shape of impact transmission members 10d according to a modification. The impact transmission member 10b of the fourth embodiment has the columnar outer shape of the semi-elliptical cross section as shown in FIG. 7. The invention is, however, not limited to this outer shape. The impact transmission member 10d has an approximately cone-like outer shape as shown in FIG. 10 and includes a leading edge that is in contact with the impact protection member 30 and an opening that is formed in its bottom to be joined with the top face S1 of the second outer cover 162 or with the side face S2, the side face S3 and the bottom face S4 of the first outer cover 161. FIG. 10 illustrates only the impact transmission members 10d and the surface joined with the impact transmission members 10d, while omitting the residual components.

The impact transmission member 10d includes a bag body 11d and a dilatant fluid 12d The bag body 11d is formed from the same material as that of the bag body 11 of the first embodiment. The dilatant fluid 12d is made of the same material as that of the dilatant fluid 12 of the first embodiment.

The fuel cell using the impact transmission members 10d of this outer shape have similar advantageous effects to those of the fuel cell 100c of the fourth embodiment. As understood from the modification, the first embodiment and the fourth embodiment described above, the impact transmission member may have any arbitrary outer shape to be joined with the top face S1 of the second cover 162 or with the side face S2, the side face S3 and the bottom face S4 of the first outer cover 161.

F3. Modification 3

According to the respective embodiments, the length of the impact transmission members 10 or 10a to 10d along the stacking direction SD may be changed adequately. For example, the length of the impact transmission member 10 of the first embodiment, the length of the impact transmission member 10b of the fourth embodiment or the length of the impact transmission member 10c of the fifth embodiment along the stacking direction SD may be shorter than the length of the stacked body 101 or the stacked body 101a along the stacking direction SD. In this modified configuration, it is preferable to place each impact transmission member 10, 10b or 10c in a location corresponding to a middle portion of the stacked body 101 or the stacked body 101a along the stacking direction SD. In the fuel cell of the modification shown in FIG. 10, the length along the stacking direction SD of an area in which the impact transmission members 10d are arranged may be shorter than the length of the stacked body 101 along the stacking direction SD. In this modified configuration, it is preferable to place the area in which the impact transmission members 10d are arranged in a location corresponding to a middle portion of the stacked body 101 along the stacking direction.

The lengths along the stacking direction SD of the third impact transmission member 10a and the fourth impact transmission member 17a of the third embodiment may be approximately equal to the length of the stacked body 101 along the stacking direction SD.

F4. Modification 4

According to the respective embodiments, the dilatant fluid 12 or 12a to 12d is made of the material obtained by kneading and drying a mixture of silicone oil and boric acid with a small amount of a catalyst in a high temperature environment. The invention is, however, not limited to this material. Any "mixture of a fluid and a solid powder" may be used as the material of the dilatant fluid 12 or 12a to 12d. The fluid employed may be water, aside from the above "material obtained by kneading and drying a mixture of silicone oil and boric acid with a small amount of a catalyst in a high temperature environment". The solid powder employed may be silica, resin powder, sand or starch.

F5. Modification 5

According to the respective embodiments, the four faces S10 to S40 of the stacked body 101 or 101a along the stacking direction SD are entirely covered by the first outer cover 161 and the second outer cover 162. According to a modification, at least one face among these four faces may be partly covered by the first outer cover 161 or the second outer cover 162. In this modified configuration, placing the impact transmission member 10 or 10a to 10d in a location corresponding to the partly covered portion of this face covered by the first outer cover 161 or the second outer cover 162 suppresses positional misalignment of the respective single fuel cells 110 or 110a.

The cross section of the stacked body 101 or 101a perpendicular to the stacking direction SD has a rectangular shape in the respective embodiments, but may have any arbitrary shape. In this modification, the first outer cover 161 and the second outer cover 162 may have any outer shape to cover at least part of the side faces of the stacked body 101 or 101a along the stacking direction.

F6. Modification 6

According to the second embodiment, the positions in the Z-axis direction of the ends 21 of the impact support film 15 are approximately equal to the position in the Z-axis direction of the fourth side face S40 of the single fuel cell 110. The invention is, however, not limited to this configuration. According to a modification, the positions in the Z-axis direction of the ends 21 of the impact support film 15 may be positions shifted in the −Z direction (i.e., vertically lower positions) from the position in the Z-axis direction of the fourth side face S40 of the single fuel cell 110. In general, the impact support film 15 employed in the fuel cell of the invention may be a cloth member that is configured to continuously cover the first side face S10 of the stacked body 101, at least a vertically lower portion on the second side face S20 of the stacked body 101 and at least a vertically lower portion on the third side face S30 of the stacked body 101.

F7. Modification 7

According to the second embodiment, the ends 21 of the impact support film 15 are free ends. According to a modification, each of the ends 21 may be joined with one of the first outer cover 161, the second outer cover 162 and the stacked body 101, such as not to form an opening. Similarly, in the third embodiment, each of the +Z-direction ends of the impact support film 15a may be joined with the first outer cover 161 or the second outer cover 162, such as not to form the opening 22a.

F8. Modification 8

According to the respective embodiments, the fuel cell 100 or 100a to 100d is mounted on the electric vehicle. The fuel cell may, however, be applied to any of various moving bodies such as a hybrid vehicle, a ship or a robot, instead of the electric vehicle. The fuel cell 100 or 100a to 100d may be used as a stationary power supply.

F9. Modification 9

According to the respective embodiments, in the state that the fuel cell 100 or 100a to 100d is mounted, X-axis direction and Y-axis direction (+Y direction and −Y direction) are directions parallel to the horizontal plane; +Z direction indicates vertically upward direction; and −Z direction indicates vertically downward direction. The invention is, however, not limited to this orientation. According to a modification, the X-axis direction and the Y-axis direction may be directions parallel to a plane intersecting with the horizontal plane, and the Z-axis direction may be a direction shifted from the vertical direction. In other words, the first side face S10 and the fourth side face S40 of the fuel cell 100 or 100a to 100d may not be necessarily parallel to the horizontal plane. The second side face S20 and the third side face S30 of the fuel cell 100 or 100a to 100d may not be necessarily parallel to the vertical direction.

The invention is not limited to any of the embodiments and the modifications described above but may be implemented by a diversity of other configurations without departing from the scope of the invention. For example, the technical features of any of the embodiments and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 10 impact transmission member (first impact transmission member)
10a third impact transmission member
10b, 10c, 10d impact transmission member
11, 11a-11d bag body
12, 12a-12d dilatant fluid
15, 15a impact support film
16, 16a dilatant fluid
17 second impact transmission member
17a fourth impact transmission member
18 side wall portion
19 main wall portion
20, 20a impact protection member
21 end
22, 22a opening
30 impact protection member
31 impact protection member
41, 42 fastening support member
57 fastening support manifold
100, 100a-100d fuel cell
101, 101a stacked body
102 deformation absorbing member
110, 110a single fuel cell
111 membrane electrode assembly
112 separator
120 terminal plate
121 connection port
130 fastening support member
151 oxidizing gas supply passage
152 oxidizing gas exhaust passage
153 fuel gas supply passage
154 fuel gas exhaust passage
155 cooling medium supply passage
156 cooling medium discharge passage
157, 158 through hole
161 first outer cover
162, 162a second outer cover
163 through hole
190 edge portion
500 side member
S1 top face
S2 side face
S3 side face
S4 bottom face
FB stress
SD stacking direction
Fg inertial force
S10 first side face
S20 second side face
S30 third side face
S40 fourth side face

The invention claimed is:

1. A fuel cell, comprising:
a stacked body that has a stacked configuration by stacking a plurality of single fuel cells;
a fastening support member that is extended along a stacking direction of the plurality of single fuel cells, is configured to fasten the stacked body in the stacking direction and includes an outer cover that is configured to cover at least part of a side face of the stacked body along the stacking direction; and
an impact transmission member that is configured to include a dilatant fluid and is placed between the stacked body and the fastening support member to be arranged in a location corresponding to multiple consecutive single fuel cells along the stacking direction among the plurality of single fuel cells, wherein the impact transmission member includes:

a impact support film that is configured to continuously cover a bottom face of the stacked body and at least a vertically lower portion on the two side face of the stacked body in the state that the fuel cell is mounted such that the stacking direction is identical with horizontal direction; and the dilatant fluid that is placed in a space between the impact support film and a inner surface of the outer cover, and an upward ends of the impact support film that are configured to be free ends and that form an opening to the space in the state that the fuel cell is mounted such that the stacking direction is identical with horizontal direction.

2. The fuel cell according to claim 1, further comprising an impact protection member that is placed between the impact transmission member and the stacked body.

3. The fuel cell according to claim 1, wherein the impact transmission member is placed in a location corresponding to multiple single fuel cells constituting a middle portion of the stacked body along the stacking direction.

\* \* \* \* \*